United States Patent Office 3,840,525
Patented Oct. 8, 1974

3,840,525
DERIVATIVES OF 6-AMINOPENICILLANIC ACID
Hirotada Yamada, Ikeda, Shigeru Okano, Ibaragi, Toshiaki Komatsu and Toyozo Katsura, Takarazuka, and Yasuko Eda, Toyonaka, Japan, assignors to Sumitomo Chemical Company Limited
No Drawing. Filed Oct. 28, 1971, Ser. No. 193,565
Claims priority, application Japan Oct. 30, 1970, 45/96,303
Int. Cl. C07d 99/16
U.S. Cl. 260—239.1                  2 Claims

ABSTRACT OF THE DISCLOSURE

6-Acylaminopenicillanic acids of the formula:

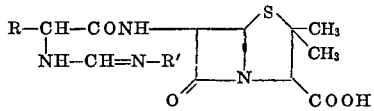

wherein R is phenyl or thienyl and R' is a substituted or unsubstituted aromatic or heterocyclic group, and their nontoxic salts, which have a broad antimicrobial spectrum and are stable to acids. These penicillin derivatives are valuable as antibacterial agents, nutritional supplements in animal feeds, therapeutic agents in poultry and animals, including man, and are especially useful in the treatment of infectious diseases caused by gram-positive and gram-negative bacteria.

---

The present invention relates to novel 6-acylaminopenicillanic acids and their production.

The 6-acylaminopenicillanic acids of this invention are representable by the formula:

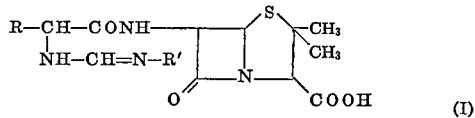

wherein R is phenyl or thienyl and R' is a substituted or unsubstituted, carbocyclic or heterocyclic group.

The carbocyclic or heterocyclic group represented by R' may be aromatic or non-aromatic and monocyclic or polycyclic. Examples of the hetero atom are nitrogen, oxygen, sulfur, etc. Thus, the carbocyclic or heterocyclic group includes specifically a 5 or 6-membered monocarbocyclic group such as phenyl or cyclohexyl, a 9 or 10-membered bicarbocyclic group such as naphthyl, a 5 or 6-membered monoheterocyclic group such as thienyl, thiazolyl, isothiazolyl, furyl, oxazolyl, isoxazolyl, pyridyl, pyrimidyl, pyranyl, morpholyl, piperazyl or piperidino, and the like. Examples of the substituent which may be present on the carbocyclic or heterocyclic ring are halogen (e.g. chlorine, bromine, iodine, fluorine), lower alkyl (e.g. methyl, ethyl, propyl, isopropyl, butyl), lower alkenyl (e.g. allyl, propenyl), lower alkoxy (e.g. methoxy, ethoxy, propoxy), lower alkylthio (e.g. methylthio, ethylthio, propylthio), nitro, amino, lower alkylamino (e.g. methylamino, ethylamino, propylamino), di(lower)-alkylamino (e.g. dimethylamino, diethylamino, dipropylamino, methylethylamino), carboxyl, lower alkoxycarbonyl (e.g. methoxycarbonyl, ethoxycarbonyl, propoxycarbonyl), carbamoyl, halo(lower)alkyl (e.g. chloromethyl, chloroethyl, bromoethyl), aryl (e.g. phenyl, naphthyl), etc. The term "lower" hereinabove used in connection with the alkyl or alkenyl moiety is intended to mean those having 1 to 8 carbon atoms, preferably 1 to 4 carbon atoms. The number of the substituents on the carbocyclic or heterocyclic ring may be one or more.

The salts of the 6-acylaminopenicillanic acids (I) are also included within the scope of this invention. Examples of such salts are inorganic salts such as the sodium, potassium, calcium and ammonium salts, organic amine salts such as the diethylamine, triethylamine, N,N-dibenzylethylenediamine, diethanolamine, pyrrolidine, morpholine and procaine salts, inorganic acid salts such as the hydrochloride, sulfate and phosphate, organic acid salts such as the acetate, propionate, benzoate, lactate, maleate, benzenesulfonate, β-naphthalenesulfonate and methanesulfonate, and the like.

Hitherto, there have been produced various semi-synthetic penicillin derivatives, some of which are highly evaluated as antimicrobial agents having a broad antimicrobial spectrum. The said 6-acylaminopenicillanic acids (I) and their non-toxic salts also have a broad antimicrobial spectrum and exhibit strong antimicrobial activities against various microorganisms, particularly gram-positive and gram-negative bacteria. Compared with known semi-synthetic penicillin derivatives presently available on the market such as aminobenzylpenicillin (i.e. 6-(D-α-aminophenylacetamido)penicillanic acid), the antimicrobial potency of the compounds of the present invention is substantially equal thereto, however, their fate or action in the living body (in vivo) is much more favorable. Further, the compounds of the invention show appreciable antimicrobial activities against various strains resistant to known antibiotics. Moreover, they are relatively stable to acids and, therefore, can be administered not only by injection but also orally in the same manner as conventional penicillin derivatives. Thus, the 6-acylaminopenicillanic acids (I) and their non-toxic salts are useful as antiinfective drugs for animals and human beings. For administration to animals or humans, the 6-acylaminopenicillanic acids of the present invention, as well as the non-toxic salts thereof, may be prepared as pharmaceutical compositions in a conventional manner together with known pharmaceutically acceptable carriers such as talc, starch, glucose, lactose, sucrose and the like.

The 6-acylaminopenicillanic acids (I) can be prepared by various methods, of which two typical examples are described below.

Method I

The 6-acylaminopenicillanic acid (I) is prepared by reacting a compound of the formula:

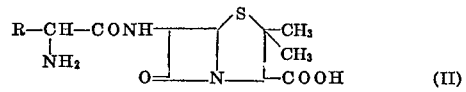

wherein R is as defined above in the free or salt form with a reagent of the formula:

$$X-CH=N-R' \qquad \text{(III)}$$

wherein X is lower alkoxy (e.g. methoxy, ethoxy, propoxy) or trihalogenomethyl (e.g. trichloromethyl, trifluoromethyl) and R' is as defined above, usually in an inert solvent (e.g. water, methanol, ethanol, dichloromethane, chloroform, dioxane, acetone, dimethylformamide, pyridine). Examples of the salt of the compound (II) are the sodium salt, potassium salt, triethylamine salt, β-naphthalenesulfonic acid salt, etc. The use of the reagent (III) in an equimolar or greater amount with respect to the compound (II) is favorable. The most preferred reaction medium is an alcoholic solvent. The reaction is normally carried out at a temperature from −50 to 80° C., preferably under cooling with ice while stirring. When the reagent (III) wherein X is trihalogenomethyl is employed, a higher temperature and a longer time may be required for completion of the reaction. The produced 6-acylaminopenicillanic acid (I) can be isolated from the reaction mixture by known conventional procedures. Depending on the procedure employed for isolation, the product may be obtained in a free or salt form.

The reagent (III) may be prepared, for instance, by reacting an amine of the formula:

$$R'—NH_2$$

wherein R' is as defined above with an orthoformic ester or anhydrous chloral at a temperature from 50 to 160° C.

Method II

The 6-acylaminopenicillanic acid (I) is prepared by reacting 6-aminopenicillanic acid of the formula:

$$H_2N\underset{O=\underset{N}{\bigg|}}{\overset{S}{\bigg\langle}}\genfrac{}{}{0pt}{}{CH_3}{CH_3} \quad (IV)$$
$$\phantom{H_2N\underset{O}{\bigg|}}\hspace{2em}COOH$$

in the free or salt form with a reagent of the formula:

$$\underset{NH-CH=N-R'}{R-CH-COOH} \quad (V)$$

wherein R and R' are each as defined above or a reactive derivative thereof, usually in an inert solvent (e.g. water, acetone, methylethylketone, methylisobutylketone, tetrahydrofuran, dioxane, dimethylformamide, dimethylacetamide, methylene chloride, chloroform, dimethylsulfoxide). Examples of the salt of the compound (IV) are the sodium salt, triethylamine salt, etc. Examples of the reactive derivatives of the reagent (V) are the acid halide, acid azide, acid anhydride, mixed acid anhydride, active ester (e.g. p-nitrophenyl ester, N-hydroxysuccinimide ester), active thioester, active thioacid anhydride, active amide (e.g. imidazole amide, triazole amide), etc. When the reagent (V) itself is employed, the presence of an appropriate condensing agent such as dicyclohexylcarbodiimide, ketene imine or an isoxazolium salt in the reaction system is favored. Moreover, the reagent (V) may be first allowed to react with phosgene and the resulting N-carboxy acid anhydride may be used in the reaction with the compound (IV). The reaction is usually carried out at a temperature from —50 to 50° C. The isolation of the produced 6-acylaminopenicillanic acid (I) from the reaction mixture can be accomplished by known conventional procedures. Depending on the procedure for isolation, the product may be obtained in a free or salt form.

The reagent (V) may be prepared, for instance, by reacting α-aminophenylacetic acid or α-aminothienylacetic acid with the reagent (III) in a protic solvent (e.g. methanol, ethanol) at a temperature from —30 to 30° C.

The thus produced 6-acylaminopenicillanic acid (I) or its salt may be converted into any other non-toxic salt by a per se conventional procedure.

As stated above, the 6-acylaminopenicillanic acids (I) and their non-toxic salts according to this invention are useful as antimicrobial agents showing a favorable action in the living body.

In the in vitro test according to a conventional liquid medium dilution method, the compounds of this invention afford generally the following minimum inhibton concentrations: e.g. 0.1 to 0.78 γ/ml. against *Staphylococcus aureus*; 6.25 to 50 γ/ml. against *Escherichia coli*; and 1.56 to 3.13 γ/ml. against *Proteus*. These values are substantially equal to those given by a well known semi-synthetic penicillin derivative, i.e. aminobenzylpenicillin. Thus, their antimicrobial potency is as strong and their antimicrobial spectrum is as broad as aminobenzylpenicillin.

When intramuscularly administered to rats, for instance, the serum level of D-α-[N-(6-methyl-2-pyridyl)formamidino]-benzylpenicillin sodium salt (cf. Example 5) is almost twice as much as that of aminobenzylpenicillin (cf. Table A). Further, for instance, D-α-(N-(2-pyrimidylformamidino)-benzylpenicillin sodium salt (cf. Example 6) affords more favorable serum levels than aminobenzylpenicillin when administered subcutaneously or orally to mice (cf. Table B) and subcutaneously to rats (cf. Table C). Furthermore, for instance, the bile level of the said D-α-(N-2-pyrimidylformamidino)-benzylpenicillin sodium salt when administered to rats by a subcutaneous route is more than three times that of aminobenzylpenicillin (cf. Table D). Moreover, for instance, the excreted amount of the said D-α-(N-2-pyrimidylformamidino)-benzylpenicillin sodium salt in the active form into urine when administered orally to rats is twice as much as that of aminobenzylpenicillian (cf. Table E).

The following tables show the above facts. (The test compounds Nos. 5 and 6 correspond respectively to those in Examples 5 and 6 hereinafter described.)

TABLE A.—SERUM LEVELS IN RATS

| Test compound | Serum level (γ/ml.) | | | | |
|---|---|---|---|---|---|
| | 0.5 hr. | 1 hr. | 2 hrs. | 3 hrs. | 4 hrs. |
| No. 5 | 39.0 | 41.5 | 34.0 | 19.0 | 10.8 |
| Aminobenzyl penicillin | 20.3 | 8.3 | 2.3 | 0 | 0 |

Test method.—Male rats of Wistar strain; 50 mg./kg. (intramuscularly); bioassay values using *Streptococcus hemolyticus*; mean values of 5 rats.

TABLE B.—SERUM LEVELS IN MICE

| Test compound | Serum level (γ/ml.) | | | | |
|---|---|---|---|---|---|
| | 0.5 hr. | 1 hr. | 1.5 hrs. | 2 hrs. | 4 hrs. |
| Subcutaneously: | | | | | |
| No. 6 | 33.0 | 32.0 | | 6.6 | 4.4 |
| Aminobenzylpencillin | 27.0 | 24.5 | | 7.8 | 0 |
| Orally: | | | | | |
| No. 6 | 5.1 | | 7.0 | | |
| Aminobenzylpenicillin | 3.6 | | 1.7 | | |

Test method.—Male mice of ICR strain; 50 mg./kg. (subcutaneously or orally); bioassay values using *Streptococcus hemolyticus*; mean values of 5 mice.

TABLE C.—SERUM LEVELS IN RATS

| Test compound | Serum level (γ/ml.) | | | | |
|---|---|---|---|---|---|
| | ⅓ hr. | ⅔ hr. | 1 hr. | 2 hrs. | 3 hrs. |
| No. 6 | 74.0 | 35.5 | 11.5 | 2.55 | 0 |
| Aminobenzylpenicillin | 69.0 | 34.5 | 15 | 5.47 | 0 |

Test method.—Male rats of Wistar strain; 50 mg./kg. (subcutaneously); bioassay values using *Streptococcus hemolyticus*; mean values of 5 rats.

TABLE D.—BILE LEVELS IN RATS

| Test compound | Bile level (γ/ml.) | | | | | |
|---|---|---|---|---|---|---|
| | 0–0.5 hr. | 0.5–1 hr. | 1–2 hrs. | 2–3 hrs. | 3–4 hrs. | 4–6 hrs. |
| No. 6 | 216 | 290 | 127 | 41.9 | 8.2 | 1.22 |
| Aminobenzylpenicillin | 72 | 92 | 38 | 17.8 | 1.7 | 0 |

Test method.—Male rats of Wistar strain; 20 mg./kg. (subcutaneously); bioassay values using *Streptococcus hemolyticus*; mean values of 3 rats.

TABLE E.—URINARY EXCRETION IN RATS

| Test compound | Urinary excretion (percent) | | |
|---|---|---|---|
| | 0–6 hrs. | 6–24 hrs. | Total |
| No. 6 | 13.58 | 2.62 | 16.20 |
| Aminobenzylpenicillin | 6.26 | 0.86 | 7.12 |

Test methods.—Male rats of Wistar strain; 50 mg./kg. (orally); bioassay values using *Streptococcus hemolyticus*; mean values of 5 rats.

The following examples serve to illustrate this invention without limiting it thereto.

Example 1

To a stirred and ice-cooled solution of sodium 6-(D-α-adminobenzylacetamido)penicillanate (0.5 g.) in ethanol (30 ml.) is added ethyl N-phenylformimidate (B.P. 117 to 118° C./40 mm. Hg; $n_D^{25}$ 1.5248; 0.3 g.), and the resultant mixture is stirred under cooling with ice for 3 hours. The reaction mixture is concentrated below 20° C. to 10 ml. After the addition of a large amount of ether, the precipitated crystals are collected by filtration, washed with ether and dried over phosphorus pentoxide in vacuo to give sodium D-α-(N - phenylformamidino) - benzylpenicillanate (0.64 g.). The quantitative analysis of the product by iodometry reveals a purity of 66%.

Examples 2 to 13

In the same manner as in Example 1, the following products are obtained:

TABLE I

| Ex. No. | Starting compound | Reagent Name | B.P. (° C./mm. Hg) | $n_D^{25}$ | Product Name | Purity (percent) |
|---|---|---|---|---|---|---|
| 2 | D-α-aminobenzylpenicillin, Na salt. | Ethyl N-2-methoxyphenyl formimidate. | 96.5-98.5/2 | 1.5332 | D-α-(N-2-methoxyphenylformamidino)-benzylpenicillin, Na salt. | 60 |
| 3 | do | Ethyl N-2-pyridylformimidate. | 110-111.5/27 | 1.5275 | D-α-(N-2-pyridylformamidino)-benzylpenicillin, Na salt. | 77 |
| 4 | do | Ethyl N-3-pyridylformimidate. | 126.5-123/25-28 | [1] 1.5284 | D-α-(N-3-pyridylformamidino)-benzylpenicillin, Na salt. | 71 |
| 5 | do | Ethyl N-(6-methyl-2-pyridyl)-formimidate. | 115-118/24 | [2] 1.5207 | D-α-[N-(6-methyl-2-pyridyl)formamidino]-benzylpenicillin, Na salt. | 74 |
| 6 | do | Ethyl N-2-pyrimidylformimidate. | 139-141/26 | | D-α-(N-2-pyrimidylformamidino)-benzylpenicillin, Na salt. | 70 |
| 7 | do | Ethyl N-piperidinoformimidate. | 92.5/27.5 | | D-α-(N-piperidinoformamidino)-benzylpenicillin, Na salt. | 70 |
| 8 | do | Ethyl N-(3-methyl-2-pyridyl)-formimidate. | 115-116.5/20 | [3] 1.5233 | D-α-[N-(3-methyl-2-pyridyl)formamidino]-benzylpenicillin, Na salt. | 75 |
| 9 | do | Ethyl N-4-pyridylformimidate. | 125-127/23 | [4] 1.5265 | D-α-(N-4-pyridylformamidino)-benzylpenicillin, Na salt. | 85 |
| 10 | do | Ethyl N-(5-chloro-2-pyridyl)-formimidate. | [5] 40-43 | | D-α-[N-(5-chloro-2-pyridyl)formamidino]-benzylpenicillin, Na salt. | 63 |
| 11 | do | Ethyl N-2-thiazolylformimidate. | 114-116/24 | [2] 1.5408 | D-α-(N-2-thiazolylformamidino)-benzylpenicillin, Na salt. | 90 |
| 12 | do | Ethyl N-2-tetrazolylformimidate. | [5] 123-125 | | D-α-(N-2-tetrazolylformamidino)-benzylpenicillin, Na salt. | 50 |
| 13 | do | Ethyl N-2-triazinylformimidate. | 128-131/22 | | D-α-(N-2-triazinylformamidino)-benzylpenicillin, Na salt. | 80 |

[1] ($n_D^{26}$). [2] ($n_D^{24}$). [3] ($n_D^{24.5}$). [4] ($n_D^{27}$). [5] Melting point.

Example 14

A mixture of sodium D-α-aminobenzylpenicillanate (0.25 g.) and N-(β,β,β-trichloroethylidene)-aniline (B.P. 105° C./6.5 mm. Hg; 3 ml.) is stirred at 70 to 75° C. for 30 minutes. The reaction mixture is cooled, and a large amount of a mixture of ether and n-hexane is added thereto. The precipitated crystals are separated centrifugally and dried over phosphorus pentoxide in vacuo to give sodium D-α-(N-phenylformamidino)-benzylpenicillanate (0.05 g). The product affords the identical spot to that of Example 1 by means of thin layer chromatography.

Example 15

To a suspension of sodium D-α-(N-phenylformamidino)-phenylacetate (M.P. 234 to 238° C. (decomp.); 1.38 g.) in methylene chloride (25 ml.), ethyl chlorocarbonate (0.54 g.) is dropwise added while stirring at −10° C. After 50 minutes, a suspension of 6-aminopenicillanic acid (1.08 g.) in triethylamine (1.01 g.) and methylene chloride (50 ml.) is added thereto, and the resultant mixture is stirred at 0° C. for 2 hours and at room temperature for 1 hour. Ether is added to the reaction mixture, and the precipitated crystals are separated by filtration. The filtrate is concentrated to dryness, and the residue is dissolved in acetone. After the addition of a solution of potassium 2-ethylhexanoate in n-butanol thereto, the precipitate is collected by filtration and dried over phosphorus pentoxide in vacuo to give potassium D-α-(N-phenylformamidino) - benzylpenicillanate (0.75 g.). The quantitative analysis of the product by iodometry reveals a purity of 75%.

Example 16

To a suspension of sodium D-α-(N-2-pyridylformamidino)-phenylacetate (M.P. 231 to 236° C. (decomp.); 13.8 g.) in methylene chloride (250 ml.), ethyl chlorocarbonate (5.4 g.) is dropwise added at 0° C. while stirring. One hour after completion of the addition, a solution of an equimolar amount of 6-aminopenicillanic acid triethylamine salt in methylene chloride (300 ml.) is added to the reaction mixture under cooling, and the resultant mixture is stirred at 0° C. for 24 hours. The reaction mixture is filtered, and the filtrate is concentrated at room temperature under reduced pressure to dryness. The residue is dissolved in acetone, and a solution of potassium 2-ethylhexanoate in n-butanol is added thereto. The precipitated crystals are collected by filtration and dried over phosphorus pentoxide in vacuo to give potassium D-α-(N-2-pyridylformamidino)-benzylpenicillanate (5.8 g.). The quantitative analysis of the product by iodometry reveals a purity of 64%.

What is claimed is:

1. A 6-acylaminopenicillanic acid of the formula:

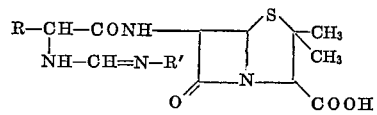

wherein R is phenyl or thienyl and R' is selected from the group consisting of unsubstituted pyrimidyl and pyrimidyl substituted with lower alkyl, lower alkoxy or halogen.

2. The 6-acylaminopenicillanic acid according to claim 1, wherein R is phenyl and R' is 2-pyrimidyl.

References Cited

UNITED STATES PATENTS

| | | | |
|---|---|---|---|
| 3,225,058 | 12/1965 | Juby | 260—239.1 |
| 3,252,971 | 5/1966 | Chow et al. | 260—239.1 |
| 3,647,781 | 3/1972 | Wieslogle et al. | 260—239.1 |
| 3,657,224 | 4/1972 | Heuser | 260—239.1 |
| 3,663,563 | 5/1972 | Fosker et al. | 260—239.1 |

NICHOLAS S. RIZZO, Primary Examiner

U.S. Cl. X.R.

424—271